US007103877B1

(12) United States Patent
Arnold et al.

(10) Patent No.: US 7,103,877 B1
(45) Date of Patent: Sep. 5, 2006

(54) SYSTEM AND METHOD FOR CHARACTERIZING PROGRAM BEHAVIOR BY SAMPLING AT SELECTED PROGRAM POINTS

(75) Inventors: Matthew R. Arnold, Ridgefield Park, NJ (US); Stephen J. Fink, Yorktown Heights, NY (US); David P. Grove, Ridgefield, CT (US); Michael J. Hind, Cortlandt Manor, NY (US); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 09/703,527

(22) Filed: Nov. 1, 2000

(51) Int. Cl.
*G06F 9/45* (2006.01)
(52) U.S. Cl. .......................... 717/130; 714/35
(58) Field of Classification Search ................ 717/133, 717/148, 128, 127, 130; 714/37, 35
See application file for complete search history.

(56) References Cited

U.S. PATENT DOCUMENTS

| | | | | |
|---|---|---|---|---|
| 4,853,884 | A * | 8/1989 | Brown et al. .................. | 708/3 |
| 5,710,724 | A * | 1/1998 | Burrows ...................... | 714/34 |
| 5,995,754 | A | 11/1999 | Hölzle et al. | |
| 6,070,009 | A * | 5/2000 | Dean et al. ................. | 717/130 |
| 6,249,912 | B1 * | 6/2001 | Blandy ....................... | 717/127 |
| 6,266,678 | B1 * | 7/2001 | McDevitt et al. ........... | 707/201 |
| 6,282,702 | B1 * | 8/2001 | Ungar ........................ | 717/148 |
| 6,327,699 | B1 * | 12/2001 | Larus et al. ................ | 717/128 |
| 6,351,844 | B1 * | 2/2002 | Bala ........................... | 717/128 |
| 6,374,367 | B1 * | 4/2002 | Dean et al. .................. | 714/37 |
| 6,442,751 | B1 * | 8/2002 | Cocchi et al. .............. | 717/133 |

OTHER PUBLICATIONS

"Profile-Guided Receiver Class Prediction", by David Grove, et al., 1995 ACM 0-89791-703-0/95/0010, pp. 108-123.
"Adaptive Systems for the Drynamic RN-Time Optimization of Programs", Gilbert J. Hansen, National Technical Information Service, Mar. 1974, AD784880.
"System Support for Automatic Profiling and Optimization", by Xiaolan Zhang, et al., Division of Engineering and Applied Sciences, Harvard University, pp. 15-26.
"Digital FX!32: Combining Emulation and Binary Translation", by Raymond J. Hookway, et al., Digital Technical Journal, vol. 9, No. 1, 1997, pp. 2-13.
"Transparent Dynamic Optimization; The Design and Implementation of Dynamo" by Vasanth Bala, et al., Hewlett Packard, 1999, pp. 2-102.
"A General Approach for the Run-Time Specialization and its Application to C", by Charles Consel, et al., 1996 ACM 0-89791-769-3/9/01, pp. 145-156.
"Reconciling Responsiveness with Performance in Pure Object-Oriented Languages", by Urs Hölzle, et al, ACM Transactions on Programming Languages and Systems, vol. 18, No. 4, Jul. 1996, pp. 355-400.
"tcc: A System for Fast, Flexible, and High-level Dynamic Code Generation", by Massimiliano Poletto, et al., 1997 ACM 0-89791-907-6/97/0006, pp. 109-121.
Profile-guided Automatic Inline Expansion for C Programs, by Pohua P. Chang, et al., Software-Practice and Experience, vol. 22(5), May 1992, pp. 349-369.
"Fast, Effective Dynamic Compilation", by Joel Auslander, et al., 1996 ACM 0-89791-795-2/96/0005, pp. 149-159.
"Exploiting Hardware Performance Counters with Flow and Context Sensitive Profiling", by Glenn Ammons, et al., 1997 ACM 0-89791-907-6/97/0006, pp. 85-96.
"Continuous Program of Optimization", by Thomas P. Kistler, University of California at Irvine, 1999, pp. 5-151.
"Efficient Compilation and Profile-Driven Dynamic Recompilation in Scheme", by Robert G. Burger, Indiana University, Mar. 1997, pp. ii-xi and 1-91.
"An Infrastructure for Profile-Driven Dynamic Recompilation", by Robert G. Burger, et al., Computer Science Department, Indiana University, pp. 1-10.
"Efficient Incremental Run-Time Specialization for Free", by Renaud Marlet, et al., University of Rennes, by , pp. 281-292.
"Optimizing ML with Run-Time Code Generation", by Peter Lee, et al., School of Computer Science, 1996 ACM 0-89791-795-2/96/0005, pp. 137-148.
"Continuous Profiling: Where Have All the Cycles Gone?", by Jennifer M. Anderson, et al., SRC Technical Note, 1997-016a, pp. 1-20.
"Implementing Jalapeño in Java", by Bowen Alpern, et al., 1999 ACM 1-58113-238-7/99/0010, pp. 314-325.
"An Evaluation of Staged Run-Time Optimizations in DyC", by Brian Grant, et al., Department of Computer Science and Engineering, University of Washington, pp. 293-304.
"The Jalapeño virtual machine", by B. Alpern, IBM Systems Journal, vol. 39, No. 1, 2000, pp. 211-238.

\* cited by examiner

*Primary Examiner*—Mary Steelman
(74) *Attorney, Agent, or Firm*—Scully, Scott, Murphy & Presser, P.C.; Marian Underweiser, Esq.

(57) ABSTRACT

A system and method for characterizing runtime behavior of a computer program executing in an execution environment, the method comprising: identifying one or more instances of yield points in a program to be executed, each yield point indicating a potential sampling operation during program execution; during program execution, in response to an identified yield point instance, ascertaining a state of the execution environment for indicating whether a sampling operation is to be performed; and, when the state of the execution environment indicates a sampling operation, recording relevant information for characterizing behavior of the execution environment. Relevant information for characterizing program behavior includes frequencies of methods executed in the program, and calling context associated with methods called by the program. Different mechanisms are provided for determining the sampling condition including the setting of a trigger bit by a runtime system, or, determining a sampling operations based on a fixed percentage of all executed yield points taken.

36 Claims, No Drawings

SYSTEM AND METHOD FOR CHARACTERIZING PROGRAM BEHAVIOR BY SAMPLING AT SELECTED PROGRAM POINTS

BACKGROUND OF THE INVENTION

1. Field of the Invention

This invention relates generally to computer program execution systems, e.g., optimizing compilers, and more specifically, to a system and method for sampling executing programs at selected program yield points to enable the characterization of runtime program behavior.

2. Discussion of the Prior Art

Many modern programming language runtime environments and tools can benefit from runtime feedback from a program. For example, Java virtual machines may use runtime feedback to guide optimization of the running program. As another example, program understanding tools may gather runtime information and report summaries to the user.

Since running programs may potentially generate vast quantities of runtime data, many systems use statistical sampling to reduce the volume of information. With this well-known technique, the system collects only a subset, or sample, of the total relevant runtime information, and infers properties of the program by extrapolating from the sample.

Although sampling is a well-known principle, a system that implements sampling faces potentially difficult engineering tradeoffs. The system must implement a sampling mechanism that gathers an interesting subset of the data, while minimizing runtime overhead. For some applications, the system must implement a mechanism that collects multiple independent samples. The system must extrapolate from the sampled data to recover the information it desires, a non-trivial task in some cases. Also, for some applications, the system must rely on compiler support to provide information about the program, and integrate this support with the runtime system.

Many compilers and programming tools collect runtime information to characterize the behavior of a running program. In order to collect runtime information, the system must periodically interrupt the running program and record information regarding the current state of execution.

There are two previous approaches to interrupting programs to collect runtime information. In the first approach, the system interrupts the program at any arbitrary instruction. For example, the DCPI profiling tool described in the reference to J. M. Andersen, L. M. Berc, J. Dean, et al. entitled "Continuous profiling: Where have all the cycles gone?", Technical Note 1997-016a, Digital Systems Research Center, September 1997, interrupts the program after executing a fixed number of instructions. An advantage of this approach is that the mechanism works for any binary program, and requires no participation by the compiler.

In the second approach, the system identifies distinguished program points at which it collects information. For example, the IBM family MMI Development Kits for Java supports invocation counters at method entries. With this approach, the compiler or interpreter conspires with the profiling system to interrupt the program at particular points. The advantage of this approach is that the compiler or interpreter can record detailed information specific to these distinguished program points. So, for example, the MMI systems record the identity of the interrupted method at each invocation counter point.

It would be highly desirable to provide improved methods and mechanisms for collecting executing program runtime information. In particular it would be highly desirable to provide improved methods and mechanisms for collecting executing program runtime information at a subset of distinguished program points in a manner so as to reduce runtime overhead.

SUMMARY OF THE INVENTION

It is an object of the present invention to provide improved methods and mechanisms for collecting executing program runtime information.

It is a further object of the present invention to provide improved methods and mechanisms for collecting executing program runtime information at a subset of distinguished program points in a manner so as to reduce runtime overhead.

According to the invention, there is provided a system and method for collecting information at a subset of distinguished program points, and particularly, a mechanism to collect a statistical sample of the information that would be collected at all identified program points. One potential advantage is that by using statistical sampling, the invention will reduce runtime overhead compared to exhaustive sampling at distinguished program points.

Advantageously, such a system and method is general enough to be applied to compiler and interpreter run-time processing environments. That is, similar mechanisms also apply when running interpreted code, as will be apparent to those skilled in the art.

DETAILED DESCRIPTION OF THE PREFERRED EMBODIMENTS

For exemplary purposes, the present invention is described for operation in a particular JVM targeting server applications that implement a "compile-only" strategy by compiling all methods to native code before they execute, such as described in the references "Jalapeno Virtual Machine", IBM Systems Journal, 39 (1), 2000 by B. Alpern, C. R. Attanasio, et al and "Implementing Jalapeno in Java", ACM Conference on Object-Oriented Programming Systems, Languages, and Applications, 1999, both of which are incorporated by reference as if fully set forth herein. However, it is understood that the principles of program characterization as described herein may be applicable for any run-time environment, e.g., JVM, interpreters, Just-in-Time compilers, etc.

In the JVM, Java threads are multiplexed onto operating system threads. The underlying operating system in turn maps pthreads to physical processors (CPUs). At any given moment in time, each virtual processor may have any number of Java threads assigned to it for execution. The system supports thread scheduling with a quasi-preemptive mechanism. Further, each compiler generates yield points, which are program points where the running thread checks a dedicated bit in a machine control register to determine if it should yield the virtual processor. Currently, the compilers insert these yield points in method prologues and on loop back edges. As known, algorithms exist that optimize placement of yield points to reduce the dynamic number of yield points executed while still supporting effective quasi-preemptive thread scheduling. Using a timer-interrupt mechanism, an interrupt handler periodically sets a bit on all virtual processors. When a running thread next reaches a yield point, a check of the bit will result in a call to the scheduler.

It is assumed that information is being collected from a compiled binary program, however, it is understood that mechanisms in accordance with the principles of the invention may be employed for running interpretive code.

According to the principles of the invention, a trigger is defined as a bit of program state that specifies whether an action should be taken. The run-time system or instrumented code may set a trigger to signal that an action should be taken. Further, a yield point is defined as a special sequence of instructions that performs the following actions when it is executed: 1) it checks the trigger bit; 2) if the trigger bit is set, the yield point is taken and some action is performed; and 3) if the trigger bit is not set, the yield point is not taken, no action is performed, and the next instruction after the yield point is executed.

At a high-level, the invention's method comprises the following steps: The compiler inserts yield points at distinguished program points. At runtime, the system periodically sets off a trigger when it decides to take a sample of current program behavior. When the running program next encounters a yield point, it observes that the trigger has been set and takes some action.

The actions performed at yield points occur at a subset of the executions of yield points. Depending on the type of information and sampling technique desired, the system implementer may choose from a variety of policies regarding where to insert yield points, when to set triggers, and what action a yield point should take.

With regard to the placement of yield points, although yield points may be placed at an arbitrary subset of program points, the preferred embodiment places yield points in all method prologues and in all loop headers (a back edge). As, in some circumstances, identifying loop headers may incur unacceptable levels of overhead, an alternative placement of yield points in all method prologues and at the targets of all backwards intra-procedural branches may be used instead. In either case, the system distinguishes between prologue yield points and loop yield points and may take different sampling actions when a yield point is taken in a method prologue rather than when a yield point is taken in a loop.

Abstractly, a prologue yield point performs the following system operations represented by the following pseudocode:

```
if (shouldTakePrologueYieldPoint) then
    takePrologueSample( )
end
```

Similarly, a loop yield point performs the following system operations:

```
if (shouldTakeLoopYieldPoint) then
    takeLoopSample( )
end
```

A preferred embodiment implements a timer based approach. Preferably, associated with shouldTakePrologueYieldPoint and shouldTakeLoopYieldPoint is the reserved bit "trigger bit" which is initially set to 0. Using standard operating system signal mechanisms, an interrupt is arranged to occur at periodic time intervals. An interrupt handler is coded to catch the timer interrupt. When the handler catches the interrupt, it sets the trigger bit to be 1. Yield points check the value of the trigger bit, and when it is 1 the yield point is taken, a sample is collected, and the trigger bit is reset to 0. In this implementation, the pseudo code for prologue yield points is as follows:

```
if (triggerBit==1) then
    takePrologueSample( )
    triggerBit=0
end
```

Similarly, the pseudo code for loop yield points is as follows:

```
if (triggerBit==1) then
    takeLoopSample( )
    triggerBit=0;
end
```

In some architectures, an efficient implementation may be to dedicate a bit in one of the CPU's condition registers to hold the trigger bit.

An alternative to the timer-based approach is use of a decrementing counter to arrange that a fixed percentage of all executed yield points are taken. For example, an implementation of the counter-based approach is given by the following pseudo-code for prologue yield points:

```
if (yieldPointCounter==0) then
    takePrologueSample( )
    yieldPointCounter=numYieldPointsToSkip;
else
    yieldPointCounter=yieldPointCounter-1;
end
```

Similarly, the pseudo-code for loop yield points for this approach is:

```
if (yieldPointCounter==0) then
    takeLoopSample( )
    yieldPointCounter=numYieldPointsToSkip;
else
    yieldPointCounter=yieldPointCounter-1;
end
```

As will be appreciated by those skilled in the art, a counter-based yield point taking mechanism may be efficiently implemented on hardware architectures such as the PowerPC that include a count register and a decrement and conditional branch on count instruction.

A third approach blends the first two implementations by using a combined counter and timer based yield points in method prologues with a timer only yield point in loops. This may be desirable to support profile-directed inlining in the manner as described in commonly-owned, co-pending U.S. patent application Ser. No. 09/703,316, the contents and disclosure of which are incorporated by reference herein. An implementation of this approach is given by the following pseudo-code for prologue yield points:

```
if (triggerBit ==1 || yieldPointCounter==0) then
    takePrologueSample( )
    if (triggerBit)
        triggerBit=0;
    end
    if (yieldPointCounter==0)
        yieldPointCounter=numYieldPointsToSkip;
    end
else
    yieldPointCounter=yieldPointCounter-1;
end
```

For loop yield points a pseudocode implementation is as follows:

if (triggerBit==1) then
   takeLoopSample( )
   triggerBit=0;
end

Again, those skilled artisans will appreciate that the above prologue yield point may be efficiently implemented on architectures with a count register and associated machine instructions.

In accordance with the invention, it is understood that a wide variety of sampling information may be collected when a yield point is taken. That is, a low-level mechanism exists that is available to map from a taken yield point to a method. Typical mechanisms include (1) inspecting the hardware state to determine the instruction address at which the yield point was taken and mapping that address to a method; and (2) inspecting the program's runtime stack to identify the method in which the yield point was taken, possibly by inspecting the return addresses stored on the runtime stack. These low-level sampling mechanisms identify and track executing methods with the frequency of executed methods being recorded for characterizing program behavior. In a similar manner, further information such as the call-context, frequency of executing basic blocks and program variable values may be recorded for characterizing program behavior.

Implementations of takePrologueSample and takeLoopSample are now provided. One implementation of takePrologueSample and takeLoopSample comprises determining which method was executing when the yield point was taken and incrementing a counter associated with that method. If the yield point was taken in a loop, then the sample should be attributed to the method containing the loop. If the yield point was taken in a prologue, then the sample may be attributed to the calling method, the called method, or to both the calling and called method. A preferred embodiment is to attribute 50% of a sample to each of the caller and callee methods.

In addition to incrementing a method counter, more complex samples may be taken to aid method inlining. For example, the techniques described in commonly-owned, co-pending U.S. patent application Ser. No. 09/703,530 entitled METHOD FOR CHARACTERIZING PROGRAM EXECUTION BY PERIODIC CALL-STACK INSPECTION, the contents and disclosure of which is incorporated by reference as if fully set forth herein, are potential embodiments for takePrologueSample, and may be used for ascertaining call-context of executing program methods.

Depending on the type of information and sampling technique desired, the system implementer can choose from a variety of policies regarding where to insert yield points, when to set triggers, and what action a yield point should take. A concrete example of this procedure to gather a statistical sample of method invocation behavior is now described.

In an example embodiment, the system collects a statistical sample of all method invocations. To use the invention, three considerations are addressed: 1) Where to insert yield points?; 2) When to set the trigger?; and 3) What action should be performed when a yield point is taken?

For this example, yield points are inserted in every method prologue with the trigger bit set off periodically based on an external timer. Further, for this example, the action will tally the number of times it is invoked from each method prologue by calling a Listener routine which records data periodically or when a sampling condition is determined.

Having specified the policies, a preferred embodiment of the mechanisms employed to implement these policies is now given.

The trigger is implemented by reserving a single bit in the computer system's memory. Initially, this bit is set to 0.

Using standard operating system signal mechanisms, an interrupt is arranged to occur at periodic time intervals with an interrupt handler coded to catch the timer interrupt. When the handler catches the interrupt, it sets the trigger bit to be 1. It is assumed that the system assigns each method in the program a unique integer identifier, called the method id. The yield point sequence of instructions, in pseudo-code, are as follows:

if (trigger bit==1) then
   call Listener(current method id)
end

Finally, we describe the implementation of the Listener routine. It keeps a table of integers, indexed by method id. Name this table the MethodCount table. The Listener routine simply increments the MethodCount table for the method i.d. that it is passed, and clears the trigger bit, as follows:

subroutine Listener(method id)
   increment MethodCount table entry for method id
   trigger bit=0

This completes the preferred embodiment for this example. Naturally, the system will later process the statistical information collected as needed, as will be obvious to those skilled in the art.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A method for characterizing runtime behavior of a computer program executing in an execution environment, said method comprising:
   a) inserting yield points comprising code to be executed at distinguished locations of a program to be executed, each said yield point indicating a conditional sampling operation during execution of said program;
   b) during program execution, unconditionally executing a yield point instance and, in response to executing said yield point instance, ascertaining a state of said execution environment for indicating whether the conditional sampling operation is to be performed; and,
   c) when a state of said execution environment indicates a condition for performing said sampling operation, recording relevant information for characterizing behavior of said execution environment, whereby conditional sampling operations performed at unconditionally executed yield points occur at a subset of the executions of yield points.

2. The method as claimed in claim 1, wherein said sampling operation includes identifying a method currently executing in said program, said method including tracking frequencies of methods executed in said program for characterizing said program behavior.

3. The method as claimed in claim 2, wherein said step of identifying a currently executing method comprises determining an instruction address at which the yield point was taken and mapping that address to a called method.

4. The method as claimed in claim 2, wherein said sampling operation includes identifying a calling context associated with methods called by said program, said method including tracking calling context frequency for characterizing said program behavior.

5. The method as claimed in claim 4, wherein said step of identifying a calling context associated with methods comprises inspecting a call-stack runtime data structure for tracking methods currently active in said executing program.

6. The method as claimed in claim 1, wherein said sampling operation includes identifying current program variable values, said program variable values being tracked for characterizing said program behavior.

7. The method as claimed in claim 1, wherein said sampling operation includes identifying basic blocks executed in said program, said method including tracking a frequency of basic blocks for characterizing said program behavior.

8. The method as claimed in claim 1, wherein when said state of said execution environment does not indicate a sampling operation, the step of executing a next instruction in said executing program after said identified yield point.

9. The method as claimed in claim 1, wherein said step b) of ascertaining a state of said execution environment includes checking status of a trigger bit set by said execution environment to indicate performance of said sampling operation.

10. The method as claimed in claim 1, wherein said trigger bit status is set periodically by said executing environment.

11. The method as claimed in claim 10, further including the steps of:
invoking a runtime system interrupt at periodic time intervals; and,
implementing an interrupt handler mechanism for catching said interrupt and setting said trigger bit.

12. The method as claimed in claim 1, further including the step of implementing a compiler device for inserting one or more yield points in said program.

13. The method as claimed in claim 1, further including the step of implementing an interpreter device for ensuring execution of said yield points in said program.

14. The method as claimed in claim 1, wherein said yield points are inserted in one or more program locations including: a method prologue and a loop back edge.

15. A method for characterizing runtime behavior of a computer program executing in an execution environment, said method comprising:
a) inserting yield points comprising code to be executed at distinguished locations of a program to be executed, each said yield point indicating a conditional sampling operation during execution of said program;
b) during program execution, unconditionally executing a yield point instance;
c) counting a number of executed yield points;
d) comparing said number against a predetermined threshold; and,
e) in response to meeting said threshold, performing a sampling operation of said executing program, and, recording relevant information for characterizing behavior of said execution environment in response to said sampling, whereby conditional sampling operations performed at unconditionally executed yield points occur at a subset of the executions of yield points.

16. The method as claimed in claim 15, wherein said sampling operation includes identifying a method currently executing in said program, said method including tracking frequencies of methods executed in said program for characterizing said program behavior.

17. The method as claimed in claim 16, wherein said sampling operation includes identifying a calling context associated with methods called by said program, said method including tracking calling context frequency for characterizing said program behavior.

18. The method as claimed in claim 17, wherein said step of identifying a calling context associated with methods comprises inspecting a call-stack runtime data structure for tracking methods currently active in said executing program.

19. The method as claimed in claim 16, wherein said step of identifying a currently executed method comprises determining an instruction address at which the yield point was taken and mapping that address to a called method.

20. The method as claimed in claim 15, wherein said sampling operation includes identifying current program variable values, said program variable values being tracked for characterizing said program behavior.

21. The method as claimed in claim 15, wherein said sampling operation includes identifying basic blocks executed in said program, said method including tracking a frequency of basic blocks for characterizing said program behavior.

22. The method as claimed in claim 15, wherein said step c) includes the steps of:
initializing a counter to said predetermined threshold; and, for each identified yield point instance,
decrementing said counter until said counter is zero, whereby said sampling operation is arranged such that a fixed percentage of all executed yield points are taken.

23. The method as claimed in claim 15, further including the step of implementing a compiler device for inserting one or more yield points in said program, said yield points being in one or more program locations including: a method prologue and a loop back edge.

24. The method as claimed in claim 15, further including the step of implementing an interpreter device for ensuring execution of said yield points in said program.

25. A system for characterizing runtime behavior of a computer program executing in an execution environment, said system comprising:
a) means for inserting yield points comprising code to be executed at distinguished locations of a program to be executed, each said yield point indicating a conditional sampling operation during execution of said program;
b) mechanism for unconditionally executing instances of yield points inserted in said executing program;
c) control device for determining a condition for performing a sampling operation of said executing program at an executed yield point instance; and,
d) sampling device for performing said sampling operation of said executing program upon satisfaction of said condition, and recording relevant information for characterizing behavior of said execution environment in response to said sampling, whereby conditional sampling operations performed at unconditionally executed yield points occur at a subset of the executions of yield points.

26. The system as claimed in claim 25, wherein said sampling device includes mechanism for identifying a method currently executing in said program; said sampling device comprising mechanism for tracking frequencies of methods executed in said program for characterizing said program behavior.

27. The system as claimed in claim 26, wherein said sampling device includes mechanism for identifying a calling context associated with methods called by said program, said tracking mechanism further tracking calling context frequency for characterizing said program behavior.

28. The system as claimed in claim 27, wherein said mechanism for identifying a calling context associated with methods comprises inspecting a call-stack runtime data structure for tracking methods currently active in said executing program.

29. The system as claimed in claim 26, wherein said mechanism for identifying a currently executed method comprises includes determining an instruction address at which the yield point was taken and mapping that address to a called method.

30. The system as claimed in claim 25, wherein said sampling operation includes mechanism for identifying current program variable values, said tracking mechanism further tracking said program variable values for characterizing said program behavior.

31. The system as claimed in claim 25, wherein said sampling device includes mechanism for identifying basic blocks executed in said program, said tracking mechanism further tracking a frequency of basic blocks for characterizing said program behavior.

32. The system as claimed in claim 25, further including:
a system location for storing a trigger bit; and,
a runtime system for said executing environment, said runtime system setting said trigger bit to indicate performance of said sampling operation; wherein, said control device ascertains a state of said system bit for determining said sampling condition.

33. The system as claimed in claim 32, wherein said runtime system includes:
interrupt mechanism for generating timer interrupt signal; and,
interrupt handler mechanism for catching said interrupt and setting said trigger bit.

34. The system as claimed in claim 25, wherein said control device comprises:
counter device for counting a number of identified yield points; and,
device for comparing said number against a predetermined threshold value, wherein, in response to meeting of said threshold, said control device initiating performing of said sampling operation.

35. The system as claimed in claim 25, further including a compiler device for inserting one or more yield points in said program.

36. The system as claimed in claim 25, further including an interpreter device for ensuring execution of said yield points in said program.

* * * * *